March 7, 1939.  L. BURGESS  2,149,270
COFFEE MAKER
Filed April 19, 1933   5 Sheets-Sheet 1
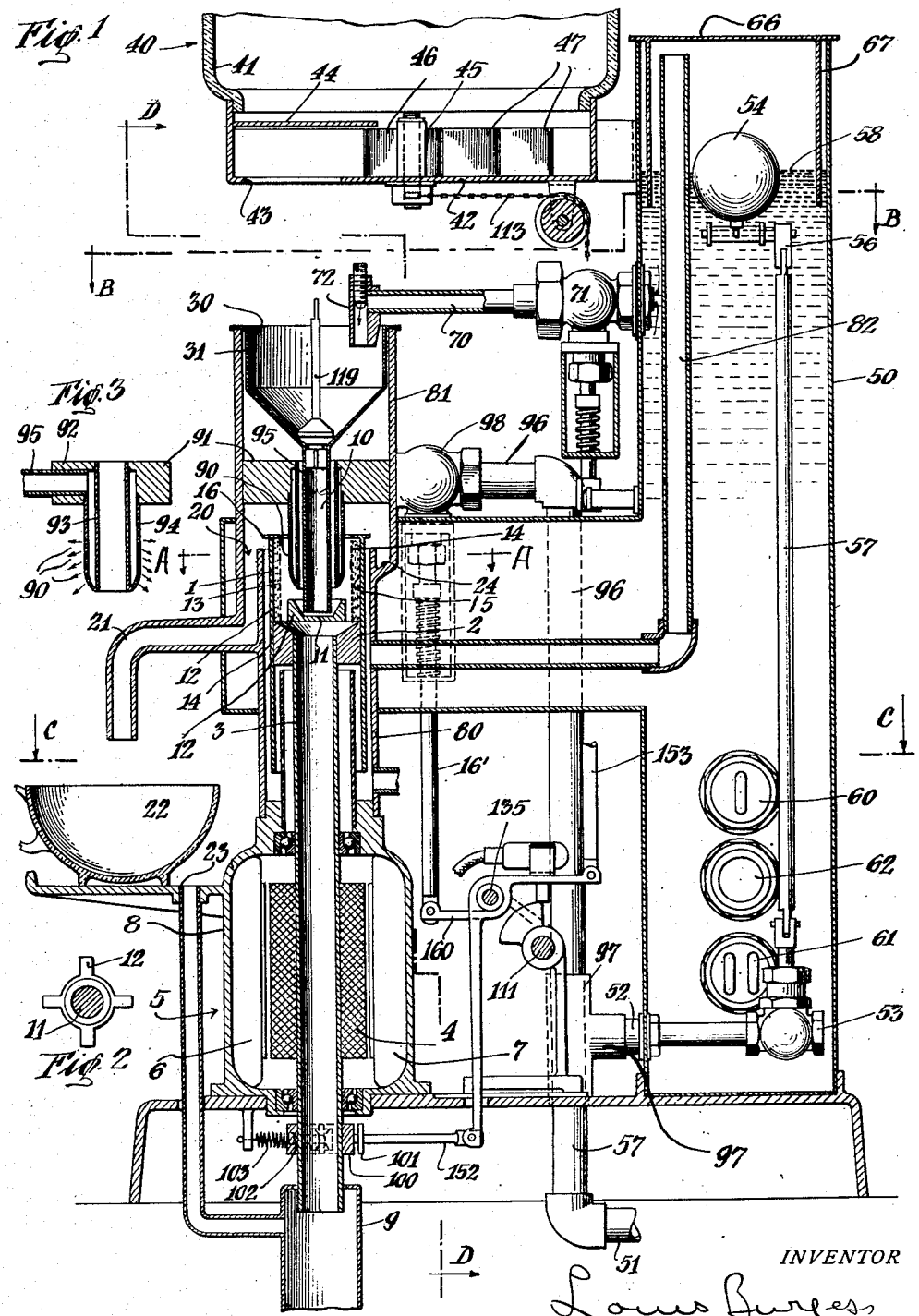
INVENTOR
Louis Burgess

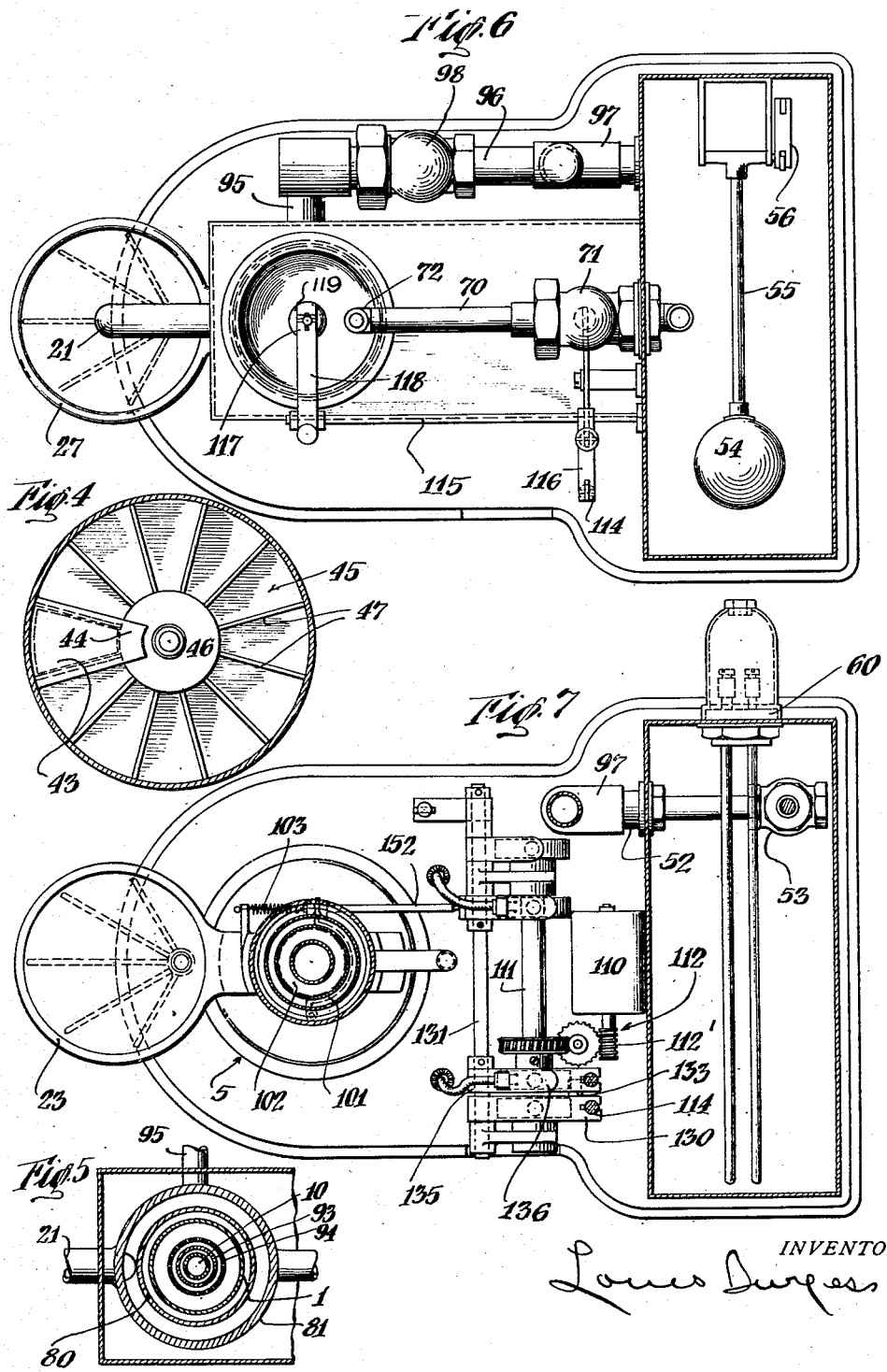

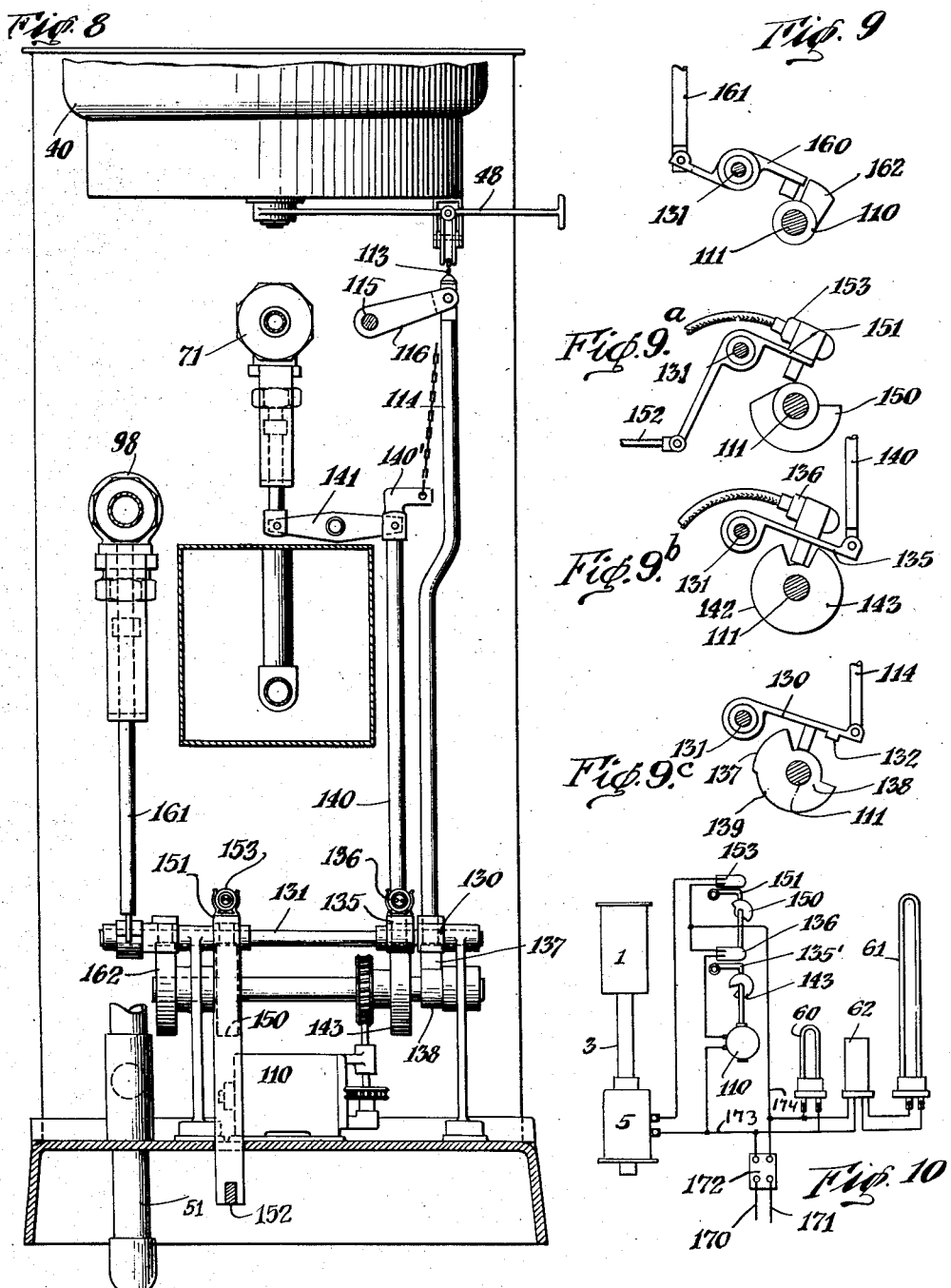

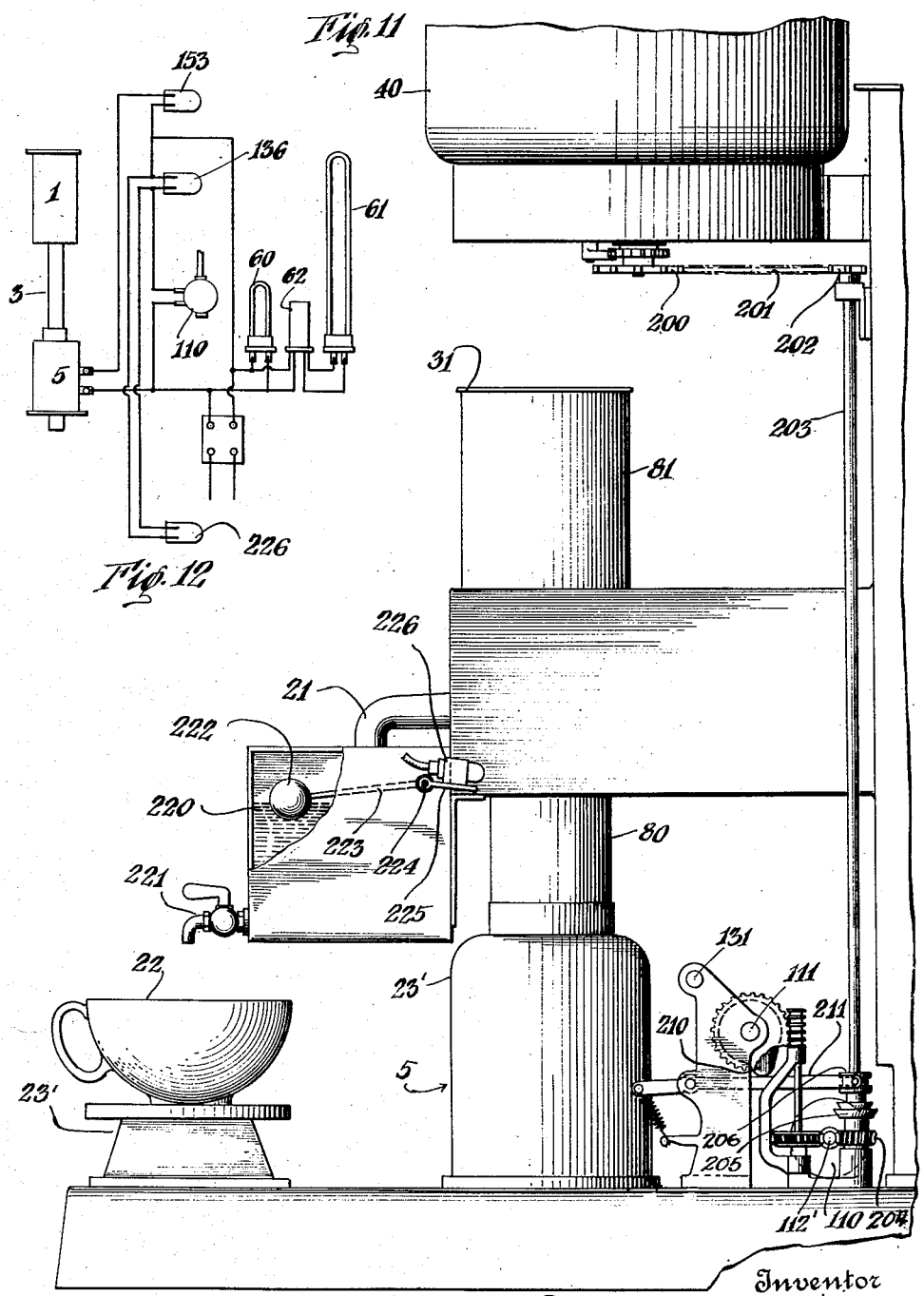

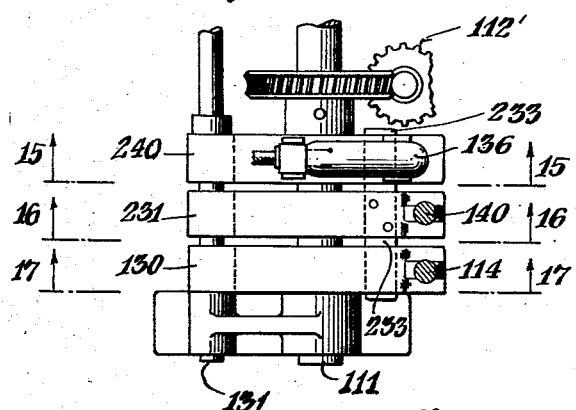
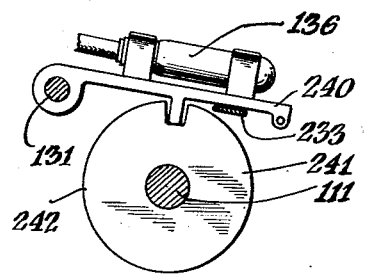
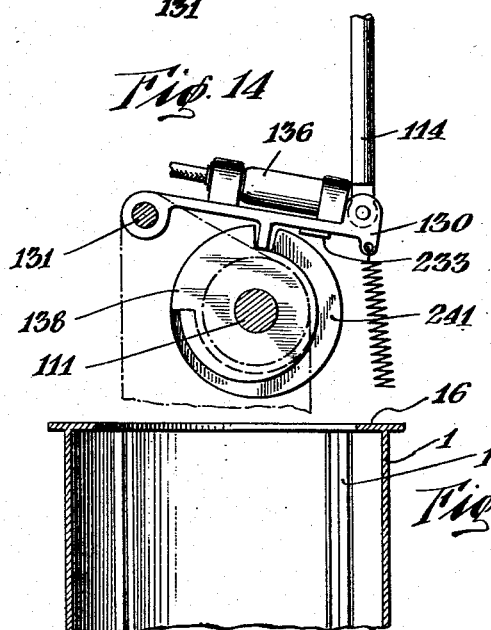
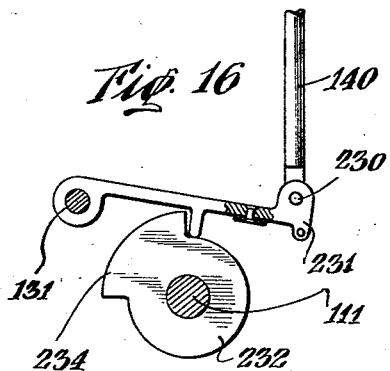
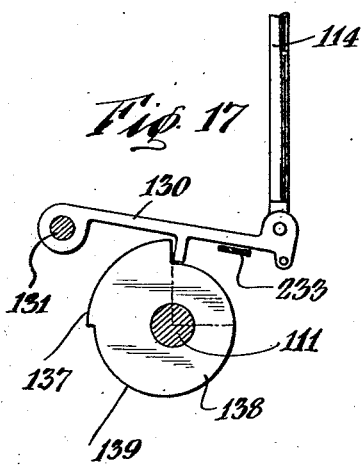
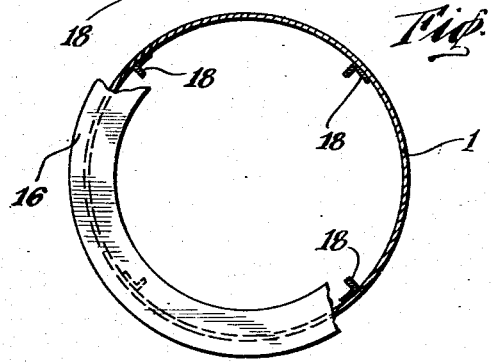

Patented Mar. 7, 1939

2,149,270

UNITED STATES PATENT OFFICE 2,149,270

COFFEE MAKER

Louis Burgess, New York, N. Y.

Application April 19, 1933, Serial No. 666,806
In Canada February 16, 1933

27 Claims. (Cl. 53—3)

The present application is a continuation in part of certain subject matter heretofore described in my prior application Serial No. 593,223, filed February 16, 1932, and in my prior application Serial No. 617,113, filed June 14, 1932.

The invention comprehends, inter alia, a device of small size in proportion to capacity and which in operation requires a minimum of attention. The device is especially suited to the rapid and economical preparation of coffee for use in restaurants, cafeterias, automats, soda fountains, etc.; where it is desired to conserve space and time to the greatest possible extent. Pursuant to the apparatus of the present invention, it is, moreover, possible to prepare beverage coffee of superior flavor at such a rate as to keep pace with the demand, thereby rendering it unnecessary to prepare coffee in advance and thereby insuring that the beverage will be delivered to the customer with the full agreeable flavor of freshly prepared coffee.

The invention will be fully understood from the following description read in conjunction with the drawings, in which:

Fig. 1 is a vertical section through one form of the coffee maker.

Fig. 2 is a top view of a part of Fig. 1.

Fig. 3 is a vertical section through part of Fig. 1.

Fig. 4 is a top view of part of Fig. 1.

Fig. 5 is a section through Fig. 1, on the plane indicated by A—A.

Fig. 6 is a horizontal section through Fig. 1, on the broken plane indicated by B—B.

Fig. 7 is a horizontal section through Fig. 1, on the plane indicated by C—C.

Fig. 8 is a vertical section through Fig. 1, on the plane indicated by D—D.

Figs. 9a, 9b and 9c are side views showing the relative positions of a number of cams which are part of Figs. 1, 7 and 8.

Fig. 10 is a wiring diagram for the apparatus disclosed in the preceding figures.

Fig. 11 is a side view with parts in section through an alternative embodiment of my invention.

Fig. 12 is a wiring diagram for the apparatus disclosed in Fig. 11.

Fig. 13 is a top of an alternative arrangement of cam mechanism adapted to control the sequence of operations of the coffee maker.

Fig. 14 is a side view of the construction shown in Fig. 13.

Figs. 15, 16 and 17 are side views of part of the construction shown in Fig. 13 taken on planes indicated by the section lines in Fig. 13 identified by the corresponding numbers.

Fig. 18 is a vertical section through an alternative form of centrifuge basket adapted to be employed in the coffee maker.

Fig. 19 is a horizontal section through the construction shown in Fig. 18.

The coffee maker includes a centrifuge of the imperforate overflow type, in which 1 is the centrifuge basket of tubular form. This is carried by the ring 2 which is secured to the hollow shaft 3. The hollow shaft is connected to the armature 4 of the motor 5 which includes the field magnets 6 and 7 in the casing 8. The motor 5 therefore rotates the centrifuge basket 1. Speeds of rotation of the centrifuge basket ranging from 2000 revolutions per minute up will be found satisfactory, although lower speeds may of course be employed. I preferably employ a universal or direct current motor so that speeds of 4000 to 10000 revolutions per minute can be obtained. In operation, a mixture of water and ground roasted coffee is fed into the centrifuge basket through the tube 10. The mixture passes into the depression 11, carried by the spider 12 (Fig. 2) and is thrown by centrifugal force against the inner wall of the basket 1. The basket is not perforated and the mixture accumulates up to the level indicated by the dotted lines 13 and 14. The residue of extracted coffee is thrown against the inner wall 15 of the basket 1, and the clarified coffee escapes over the rim 16. The coffee is caught in the collector ring 20 and flows out through the pipe or outlet 21 into any suitable receptacle placed adjacent the centrifuge, such as cup 22 carried by platform 23. The collector ring preferably has a sloping floor 24 to accelerate flow of coffee into cup 22.

In operating the coffee maker it is necessary to feed a mixture of hot water and ground roasted coffee into the centrifuge basket 1, and this mixer is preferably a part of the coffee maker. The mixer 30 includes the funnel 31 connected to the pipe 10. In operation, it is necessary to introduce the coffee and hot water to the funnel 31, and the velocity with which the water is introduced is ordinarily sufficient to effect the mixing, viz., to disperse the coffee in the water. For this purpose the necessary charge of ground roasted coffee is dropped into the funnel 31 from the dispenser 40. The dispenser 40 includes the hopper 41 which holds the coffee and the bottom 42. The bottom carries the hole 43, preferably located directly above funnel 31 for gravity discharge. The coffee in the hopper is prevented from running through the hole 43 by the plate 44. In the bottom of the hopper is located the wheel 45 consisting of the hub 46 and the spokes 47 (Fig. 4). When this wheel is turned a short distance a charge of coffee carried between two of the spokes is carried over the hole 43 and drops into the funnel 31. The dispenser may either be operated by hand or may be geared into the remainder of the apparatus so that it is operated mechanically or electrically. In the form illustrated (Fig. 8) the dispenser may be operated by the hand lever 48 which is connected to the wheel 45 by a ratchet, so that after the wheel has been advanced through part of a revolution the lever is returned to its original position by means of a spring (not shown) while the wheel remains in the advanced position. The dispenser 40 may, of course, be omitted and the coffee introduced into the funnel 31 by hand. The dispenser is preferred where not more than one liter of coffee is to be made in a single operation of the centrifuge. Where a larger quantity is made in a single operation, the coffee is preferably introduced by hand.

The coffee maker preferably includes the means for making and introducing the hot water to the mixer. In the form illustrated this consists of tank 50. Water is brought into the coffee maker through the pipe 51 and passes through the branch 52 to the needle valve 53. The needle valve is controlled by the float 54. The float 54 (Fig. 6) is connected through rod 55 to the arm 56 which is pinned to the rod 57 (Fig. 1). When the float sinks the rod 57 is lifted and valve 53 opens. When the float rises rod 57 is depressed and valve 53 closes. This operates to maintain a substantially constant liquid level 58 in tank 50. The water in the tank is continuously heated by resistance heater 60, and whenever cold water is introduced it is heated by resistance heater 61 controlled by thermostat 62. It will be noted that heater 60 is at a higher level than heater 61. The water above resistance heater 60 is therefore held uniformly at the boiling point. From tank 50 the water passes through side arm 70 controlled by valve 71 to the outlet 72 which discharges the water into funnel 31 (Fig. 1).

It will be noted that the pipes 80 and 81 which are part of the collector ring 20, together with funnel 31, form a casing about the centrifuge basket 1. In operation, steam from the top of tank 50 passes through the pipe 82 into this casing, thereby driving out any air originally present and preventing air from entering the casing. This prevents air from mixing with the coffee which would be detrimental because it forms a cloud in the beverage. The steam from the top of tank 50 is diverted into the pipe 82 by means of the cover 66 and the skirt 67 which extends below the water level 58 and thereby forms a water seal.

At the expiration of a run, the residue of extracted coffee may remain, in whole or in part, banked up against the inner wall 15 of centrifuge basket 1. This may, however, be speedily removed from the apparatus by means for forcibly cleaning the interior of the same, such as jets of water which issue from the perforations 90 in the distributor (Fig. 3). The distributor includes the disk 92, inner imperforate tube 93 and outer perforate tube 94. Water enters the distributor under pressure through the pipe 95 which is connected (Fig. 6) to the valved pipe 96, which in turn is connected through the T 97 to the water inlet pipe 51.

It is of course necessary that the rotation of the basket be stopped prior to discharging the jets of water from the perforations 90, and for this purpose a brake 100 is provided which includes the brake band 101 and the drum 102 carried by and secured to the shaft 3 (Fig. 1). Any alternative means for forcibly cleaning the interior of the centrifuge basket 1 may be employed within the broad purview of my invention:—for example, where the interior of the centrifuge basket is substantially smooth and unobstructed, the liquid in the basket will continue in rotation even after the basket itself has stopped. Where the basket speed is sufficient, say of the order of 3000 or more revolutions per minute, and where the braking action is sufficient to promptly stop the rotation of the basket, it will be found that much of the coffee residue will be forcibly sheared from adhesion to the inner wall 15 of the basket by the rotational velocity of the liquid. As soon as the rotational velocity of the liquid falls below a certain point, the liquid and the major part of the coffee residue will drop by gravity out of the centrifuge basket through the hollow spindle 3.

It will be apparent from the foregoing that the complete operation of the device involves— first: the introduction of ground coffee and hot water to the mixer 30; second: passing the mixture into the centrifuge basket while the same is being rapidly rotated, simultaneously collecting the clear coffee beverage which overflows from the centrifuge basket, and thereafter stopping the rotation of the centrifuge basket and removing the residue of extracted coffee therefrom. This completes the cycle of operations and leaves the machine in condition for a new cycle.

In addition, the coffee is preferably held in the mixer 30 in contact with hot water for a definite period sufficient to insure that the coffee will be water soaked and fully extracted. Coffee which is not water soaked would float and would therefore be carried out of the centrifuge with the overflow. The necessary time will vary with the size of the coffee granules and can easily be determined. In particular, with coffee passing 30 mesh, 10 seconds time of contact with hot water has been found sufficient; and with coffee passing 40 mesh, 5 seconds time has been found sufficient. About 10 grams of coffee will be found sufficient for a cup containing 200 cubic centimeters. For this capacity the centrifuge basket may have a length inside of about 5 centimeters, an inside diameter of about 5 centimeters, and the depth of the rim 16 measured from the inner wall 15 of the centrifuge basket may be about 6 millimeters. These dimensions are merely illustrative. For larger capacities the size will be proportionately increased. With a rotational speed in excess of 3000, 200 centimeters of clear coffee can be separated in about 10 seconds in a basket of the size mentioned. With higher speeds this time can be further reduced.

While the entire sequence of operations can be controlled by hand, means are preferably provided to automatically hold the coffee in contact with water in the mixer for a definite time, to automatically stop the motor after a definite quantity of coffee has been produced, and to thereafter automatically control the jets of water discharged from the perforations 90. In general, any suitable control may be employed for this purpose. The means which has been found best suited is illustrated in the drawings. This includes the motor 110 (Fig. 7) which drives the shaft 111 through the gear train 112. The motor may, if desired, be synchronous. Where, however, the applied voltage is substantially constant, any type of motor will be found to function with sufficient regularity that the slight deviation of time during successive cycles is not sufficient to prejudice the operation of the apparatus, and within the time limits which it is necessary to maintain for successful operation, all such motors, if connected to a circuit of substantially constant voltage, will function as elapsed time controls. The shaft 111 may, for example, make a complete revolution in 20 seconds. When the dispenser hand lever 48 has drawn forward to drop a charge of coffee into the funnel 31, the chain 113 (Fig. 8) simultaneously lifts the connected rods 114. This performs several functions: for example, it turns the shaft 115 which is pivotally connected to rod 114 by the crank 116 (Fig. 6). This operation depresses the end 117 of the crank 118 which controls the valve 119 (Fig. 1), thereby preventing flow of coffee and water out of the funnel 31. The lower end of rod 114 simultaneously picks up the rocker 130 pivotally carried by the shaft 131 (Fig. 7). The rocker 130 carries a projection 133 which extends under the adjacent rocker 135. The rocker 135 carries mercury switch 136 in series with time control motor 110, which switch is thereby drawn to closed circuit position starting the motor 110. The rocker 135 is connected to the rod 140 (Fig. 8), and this rod is simultaneously lifted, thereby operating through the rocker arm 141 to open the valve 71 which controls the flow of hot water to the mixer. A single movement of the dispenser lever 48 operates, therefore, to simultaneously introduce coffee to the mixer, close the valve 119, open the valve 71, and start time control motor 110. The dispenser lever 48 may be released as the rocker 130 (Fig. 9c) will continue to ride on the elevated portion 137 of the cam 138, and the rocker 135 will continue to ride on the elevated portion 142 of the cam 143 (Fig. 9b), thereby continuing the operation of the control motor 110. At the expiration of 5 seconds, the cam 138 drops the rocker 130, thereby opening valve 119. This opening is preferably effected gradually by the portion 139 of cam 138 to prevent a sudden surge of the mixture into the centrifuge basket. Before the valve 119 opens, the continued rotation of shaft 111 by means of cam 150 and rocker 151 (Fig. 9a) has lifted mercury switch 153, thereby throwing the mercury switch 153, which is in series with centrifuge motor 5, to on circuit position. The rocker 151 simultaneously pulls brake rod 152, thereby releasing brake 100. This insures that the centrifuge basket will be properly rotating at the time the mixture of coffee and water enters. At the expiration of 15 seconds from the starting time, the cam 150 drops the rocker 151, thereby breaking the circuit through motor 5 and simultaneously applying the brake 100 through spring 103 (Figs. 1 and 7). The stopping of the motor may require from 1 to 2 seconds, and the continued rotation of the shaft 111 through cam 162 will thereafter operate the rocker 160 (Fig. 9), thereby pulling the rod 161 which operates the valve 98 controlling the flow of water through pipes 95, 96 and 97 to the perforations 90. This washes the centrifuge basket clean, the mixture of coffee residue and water flows through the hollow shaft 3 to any suitable pipe 9 which conducts the same away (Fig. 1). Sufficient time should elapse between the stopping of the centrifuge basket and the introduction of the cleaning water to permit the liquid in the centrifuge basket to exhaust its rotational velocity, otherwise part of the cleaning water may be thrown over the lip 16 by the remanent centrifugal velocity of the liquid in the centrifuge basket. At the expiration of 20 seconds, the rocker 160 is released and the rocker 135 is also released, thereby breaking the control motor circuit and placing the machine at rest. The times just noted will be found sufficient where coffee of a fineness passing 50 mesh is employed.

The electrical circuit for use with the apparatus described is shown in Fig. 10, in which single phase current is supplied through leads 170 and 171, controlled by switch 172 to the wires 173 and 174. It will be noted that the electric resistance heater 60 is continuously on circuit during operation. This heater is preferably proportioned to insure the continuous generation of a small amount of steam in tank 50 which passes off through pipe 82. Heater 61, controlled by thermostat 62, is switched on whenever cold water enters the tank and brings the same up to the boiling point.

If desired, the apparatus can be so constructed that it is placed in operation by a push button, or similar device, which effects a transient energization of the control motor circuit. In this case, the dispenser 40 may be operated by a solenoid connected to the dispenser lever 48, which solenoid is connected in multiple with the control motor 110.

With the addition of such means, or any similar means, whereby the dispenser is mechanically operated whenever the control motor is energized, the device may be made fully automatic, so that it is only necessary to withdraw coffee as required from a small storage tank. In this case, a small tank is provided in place of cup 22 from which the coffee may be drawn whenever required. A float in this tank operates a mercury switch whenever the level of coffee in the tank falls below a certain point, and this switch is connected in multiple with mercury switch 136. In this manner, the apparatus will be started whenever the level of coffee in the last mentioned tank falls below a certain point and the apparatus will automatically run through a complete cycle. If the level in the tank is then high enough to throw off the float control mercury switch, the apparatus will come to rest, and if not will continue through a second cycle of operations, and so forth.

The preferred apparatus for the accomplishment of this purpose is illustrated in Figs. 11 and 12. In this case, the dispenser 40 is actuated by the sprocket 200 which is geared to the wheel 46. The sprocket 200 is actuated through chain 201 by the smaller sprocket 202. Sprocket 202 is carried by the shaft 203. Whenever the time control motor 110 starts in operation, it operates through the worm 112' to turn the worm gear 204 which is carried by shaft 203 but is not keyed to the same and is freely rotatable with respect to shaft 203. Clutch member 205 is secured to gear 204, and clutch member 206 is splined to shaft 203. The rotation of shaft 111 driven by motor 110 operates to depress rocker arm 211 by means of the cam 210 (Fig. 11), thereby throwing clutch members 205 and 206 into engagement. During engagement the shaft 203 rotates, thereby turning sprocket 200 and actuating wheel 46 in dispenser 40. When the wheel has been moved sufficiently to drop a charge of coffee into funnel 31, the cam 210 releases the rocker arm 211, thereby freeing the clutch and immobilizing shaft 203. The clarified beverage coffee flowing from the pipe 21 may be caught in the vented tank or receptacle 220, from which it is drawn as required by means of faucet 221 into the receptacle 22 carried by the platform 23'. The float 222 in tank 220 is responsive to the liquid level therein. This float is connected through rods 223, 224 and 225 to mercury switch 226 which is external to the tank. Whenever the mercury switch 226 is drawn to on circuit position by a lowering of the liquid level in tank 220, the control motor 110 is started, thereby actuating the dispenser through the mechanism just described and actuating the remainder of the apparatus through the mechanisms hereinbefore described. Once the control motor has been started the cam 143 (Fig. 9b) will hold this motor on circuit until a complete cycle of operations has been concluded. If the level in tank 220 is then sufficiently high, the machine will not repeat; and if the level is not sufficiently high, the machine will pass through a second complete cycle.

I may, of course, if desired, omit the tank 220 and arrange the pipe 21 to discharge directly into the receptacle 22 as in Fig. 1. If the mercury switch 226 is located so that it can be manually operated, the transient movement of this switch to on circuit position will set the apparatus in operation and cause the machine to pass through a complete cycle, with the resultant delivery into the receptacle of the predetermined desired amount of finished beverage.

With the finer grades of coffee and relatively shorter periods of operation, I find it advantageous to employ the modified control mechanism illustrated in Figs. 13 to 17 inc. The purpose of this mechanism is to introduce all, or substantially all, of the hot water to the mixer 30 before the valve 119 is opened, thereby insuring that the amount of water introduced prior to the opening of the valve 119 will be sufficient to drive the coffee beneath the surface of the water and to insure that all of the coffee is thoroughly wetted. In this case, the water is controlled as heretofore by means of the rod 140. This is connected through pin 230 to the rider 231 which rides on the cam 232 carried by the shaft 111. The corresponding cam 143, heretofore described, is of course omitted. Inasmuch as the rider 231 is in this case the first to drop, the apparatus must be so arranged that rider 231 can drop without interference with the associated parts of the apparatus. For this purpose, the mercury switch 136 is carried by an independent rider 240 which rides on cam 241. Whenever rider 231 is lifted, the cross-bar 233 riveted thereto picks up the rider 240, thereby throwing mercury switch 136 to on circuit position and starting control motor 110. This starts 111 is rotation. For 5 seconds the rider 231 rides on the elevated portion 234 of the cam 232 and then returns to rest position, thereby closing valve 71 which controls the introduction of hot water to mixer 30. The valve 71 is of course so proportioned that the entire quantity of hot water necessary to make the desired batch of coffee is introduced during this period. Cam rider 240, however, continues to ride on the elevated portion 242 of cam 241 until the complete cycle of operations has been finished, whereupon it returns to rest position thereby completing a cycle. The opening of the foot valve 119 is controlled through rod 114, cam rider 130 and cam 138 in the same manner as previously described. With this exception however, that inasmuch as this cam rider 130 returns to rest position more slowly than rider 231, it must be free to operate independently of the return of rider 231. This is accomplished in the following manner. Rider 130 is lifted to operative position by the cross-bar 233 carried by the rider 231, so that the return of rider 231 to rest position does not interfere with the more gradual return of the rider 130. In this case, the chain 113 from the dispenser lever 48 is connected to rod 140 through the projection 140', instead of to the rod 114 as heretofore. When operating the sequence control shown in Figs. 13 to 17 inc., the effect of moving the dispenser lever 48 is, therefore, to lift rod 140 by means of chain 113. This simultaneously lifts the riders 231, 240 and 130, thereby opening water valve 71, energizing control motor 110, and through rod 114 closing foot valve 119. At the expiration of 5 seconds, water valve 71 closes and foot valve 119 commences to open. The centrifuge motor 5 is started by means of cam 150 and cam rider 151 (Fig. 9a) in the same manner as previously described, so that the motor is up to speed before the foot valve 119 begins to open. The profile of cam 138 is so formed that the mixer 30 empties its contents into the centrifuge basket 1 during the predetermined time, say for example during 10 seconds. As soon as the mixer is emptied, cam 150 breaks the centrifuge motor circuit and brakes the motor. Within a few seconds thereafter cam 110 through rider 160 (Fig. 9) opens valve 98 which controls the flushing water; and at the expiration of 20 seconds, the apparatus returns to its original position.

Where water jets are employed to wash down the residue of extracted coffee from the centrifuge basket 1, I find it of advantage to provide obstructions on the inner wall of the centrifuge basket adapted to arrest the rotational velocity of the liquid and to prevent the liquid from continuing to spin in the centrifuge basket after the same has been stopped. This may, for example, be accomplished by the longitudinally extending baffles 18. This permits of the more prompt introduction of the flushing water and the consequent shortening of the entire cycle by a few seconds.

The foregoing description is furnished by way of illustration and not of limitation, and it is therefore my intention that the invention be limited only by the appended claims or their equivalents, wherein I have endeavored to claim broadly all inherent novelty.

I claim:

1. A coffee maker comprising a centrifuge, including a centrifuge basket of the imperforate overflow type, means for rotating said basket, a collector ring encircling one end of said basket, means defining an outlet from said collector ring adapted to discharge during the operation of said centrifuge into a vessel positioned adjacent said centrifuge, a mixer adapted to mix hot water with ground roasted coffee, and means defining an outlet from said mixer into said centrifuge.

2. A coffee maker according to claim 1, comprising in addition means for holding said ground roasted coffee in contact with hot water in said mixer for a predetermined time prior to passage into said centrifuge basket.

3. A coffee maker comprising a centrifuge, including a centrifuge basket of the imporforate overflow type, means for rotating said basket, a collector ring encircling one end of said basket, an outlet from said mixer into said centrifuge basket, a dispenser adapted to deliver a charge of ground roasted coffee into said mixer, a hot water tank, a valved pipe from said tank to said mixer, a receptacle beneath the said outlet, a float movable within said receptacle, and means actuated by the downward movement of said float in response to the abstraction of liquid from said receptacle for actuating said dispenser, for setting in operation the said basket rotating and charge delivering means, and for opening the valve in said pipe.

20. A coffee maker according to claim 19, comprising in addition means for forcibly cleaning the interior of said basket, and means for terminating the operation of said basket rotating means and for setting in operation said means for forcibly cleaning when a predetermined mass of liquid has passed from the said outlet.

21. A coffee maker comprising a centrifuge, including a centrifuge basket of the imperforate overflow open bottom type, means for rotating said basket, a collector ring encircling one end of said basket, means defining an outlet from said collector ring adapted to discharge during the operation of said centrifuge into a receptacle positioned adjacent said centrifuge, a duct leading downwardly from adjacent the lower part of said basket to and communicating with the exterior of said coffee maker, means for forcibly cleaning the interior of said basket, a mixer adapted to mix hot water with ground roasted coffee, an outlet from said mixer into said centrifuge basket, a dispenser adapted to deliver a charge of ground roasted coffee into said mixer, a hot water tank, a valved pipe from said tank to said mixer, a float movable within the said receptacle, means actuated by the downward movement of said float in response to the withdrawal of liquid from said receptacle adapted to set in operation the said dispenser to open the said valve, to set in operation the said basket rotating means, and elapsed time apparatus adapted to thereafter terminate the operation of the means for rotating said basket and to set in operation the said means for forcibly cleaning the interior of said basket.

22. A coffee maker comprising a centrifuge, including a centrifuge basket of the imperforate overflow type, means for rotating said basket, a collector ring encircling one end of said basket, means defining an outlet from said collector ring adapted to discharge during the operation of said centrifuge into a vessel positioned adjacent said centrifuge, a mixer adapted to mix hot water and ground roasted coffee, means defining an outlet from said mixer adapted to discharge into the interior of said basket, a casing surrounding said basket, and means for introducing steam to said casing.

23. A coffee maker comprising a centrifuge, including a centrifuge basket of the imperforate overflow type, means for rotating said basket, a collector ring encircling one end of said basket, means defining an outlet from said collector ring adapted to discharge during the operation of said centrifuge into a vessel positioned adjacent said centrifuge, a mixer adapted to mix hot water with ground roasted coffee, means defining an outlet from said mixer into said centrifuge basket, a non-pressure water storage tank extending above the level of said mixer, a valved pipe from said tank to said mixer, a casing surrounding said centrifuge basket, and a pipe adapted to conduct steam from the upper part of said storage tank into said casing.

24. A coffee maker comprising a centrifuge, including a centrifuge basket of the imperforate overflow type, means for rotating said basket, a collector ring encircling one end of said basket, means defining an outlet from said ring adapted to discharge during the operation of said centrifuge into a vessel positioned adjacent said centrifuge, means for mixing hot water with ground roasted coffee, means defining an outlet from said mixer into the said basket, a non-pressure water storage tank extending above the level of the said mixer, means for maintaining a constant liquid level in said tank, and a valved pipe from said tank to said mixer.

25. A coffee maker comprising a centrifuge, including a centrifuge basket of the imperforate overflow type, means for rotating said basket, a collector ring encircling one end of said basket, means defining an outlet from said collector ring adapted to discharge during the operation of said centrifuge into a vessel positioned adjacent said centrifuge, a mixer adapted to mix hot water with ground roasted coffee, means defining an outlet from said mixer into said centrifuge basket, a non-pressure water storage tank extending above the level of said mixer, means for maintaining a constant liquid level in said tank, a valved pipe from said tank to said mixer, means for opening said valved pipe and for setting in operation said basket rotating means, and elapsed time apparatus adapted to close said valved pipe at the expiration of a predetermined time.

26. A coffee maker comprising a centrifuge, including a centrifuge basket of the imperforate overflow open bottom type, means for rotating said basket, a collector ring encircling one end of said basket, means defining an outlet from said ring adapted to discharge during the operation of said centrifuge into a vessel positioned adjacent said coffee maker, a mixer adapted to mix hot water and ground roasted coffee, means defining an outlet from said mixer into said basket, and means for terminating the operation of the means for rotating said basket when a predetermined mass of liquid has passed from the outlet from said collector ring.

27. A coffee maker comprising a centrifuge, including a centrifuge basket of the imperforate overflow open bottom type, means for rotating said basket, a collector ring encircling one end of said basket, means defining an outlet from said ring adapted to discharge during the operation of said centrifuge into a vessel positioned adjacent said coffee maker, a mixer adapted to mix hot water and ground roasted coffee, means defining an outlet from said mixer into said basket, and elapsed time apparatus adapted to terminate the operation of the means for rotating said basket at the expiration of a predetermined time.

LOUIS BURGESS.

means defining an outlet from said collector ring adapted to discharge during the operation of said centrifuge into a vessel positioned adjacent said centrifuge, a mixer adapted to mix hot water and ground roasted coffee, means defining an outlet from said mixer into said centrifuge basket, and a dispenser adapted to deliver a charge of ground roasted coffee into said mixer.

4. A coffee maker according to claim 3, comprising in addition means for holding said ground roasted coffee in contact with hot water in said mixer for a predetermined time prior to passage into said centrifuge basket.

5. A coffee maker comprising a centrifuge, including a centrifuge basket of the imperforate overflow type, means for rotating said basket, a collector ring encircling one end of said basket, means defining an outlet from said collector ring adapted to discharge during the operation of said centrifuge into a vessel positioned adjacent said centrifuge, a mixer adapted to mix hot water and ground roasted coffee, means defining an outlet from said mixer into said centrifuge basket, a hot water tank, and a valved pipe from said tank to said mixer.

6. A coffee maker according to claim 5, comprising in addition a dispenser adapted to deliver a charge of ground roasted coffee into said mixer.

7. A coffee maker comprising a centrifuge, including a centrifuge basket of the imperforate overflow open bottom type, means for rotating said basket, a collector ring encircling one end of said basket, means defining an outlet from said collector ring adapted to discharge during the operation of said centrifuge into a receptacle positioned adjacent the said centrifuge, means for forcibly cleaning the interior of said basket, and a duct leading downwardly from adjacent the lower part of said basket to and communicating with the exterior of said coffee maker.

8. A coffee maker according to claim 7, in which the means for forcibly cleaning the interior of said basket includes means for discharging jets of water against the interior of the same.

9. A coffee maker according to claim 7, in which the means for forcibly cleaning the interior of said basket includes means for discharging jets of water against the interior of the same, and in which the centrifuge basket is carried by a hollow spindle through which material washed out of the interior of said centrifuge basket passes out of the apparatus.

10. A coffee maker comprising a centrifuge, including a centrifuge basket of the imperforate overflow open bottom type, means for rotating said basket, a collector ring encircling one end of said basket, means defining an outlet from said collector ring adapted to discharge during the operation of said centrifuge into a receptacle positioned adjacent the said centrifuge, a mixer adapted to mix hot water and ground roasted coffee, means defining an outlet from said mixer into the interior of said basket, means for forcibly cleaning the interior of said basket, and a duct leading downwardly from adjacent the lower part of said basket to and communicating with the exterior of said coffee maker.

11. A coffee maker according to claim 10, in which the means for forcibly cleaning the interior of said basket includes means for discharging jets of water against the interior of the same.

12. A coffee maker according to claim 10, in which the means for forcibly cleaning the interior of said basket includes means for discharging jets of water against the interior of the same, and in which the centrifuge basket is carried by a hollow spindle through which material washed out of the interior of said centrifuge basket passes out of the apparatus.

13. A coffee maker comprising a centrifuge, including a centrifuge basket of the imperforate overflow open bottom type, means for rotating said basket, a collector ring encircling one end of said basket, means defining an outlet from said collector ring adapted to discharge during the operation of said centrifuge into a receptacle positioned adjacent said centrifuge, means for forcibly cleaning the interior of said basket, a duct leading downwardly from adjacent the lower part of said basket to and communicating with the exterior of said coffee maker, and means for terminating the operation of the means for rotating said basket and for setting in operation the said means for forcibly cleaning the interior of said basket when a predetermined mass of liquid has passed from the said outlet.

14. A coffee maker according to claim 13, in which the means for forcibly cleaning the interior of said basket includes means for discharging jets of water against the interior of the same.

15. A coffee maker according to claim 13, in which the means for forcibly cleaning the interior of said basket includes means for discharging jets of water against the interior of the same, and in which the interior of said basket carries obstructions adapted to arrest the rotational movement of liquid in said basket after the basket has been stopped.

16. A coffee maker according to claim 13, in which the means for forcibly cleaning the interior of said basket includes means for discharging jets of water against the interior of the same, and in which the centrifuge basket is carried by a hollow spindle through which material washed out of the interior of said centrifuge basket passes out of the apparatus.

17. A coffee maker comprising a centrifuge, including a centrifuge basket of the imperforate overflow open bottom type, means for rotating said basket, a collector ring encircling one end of said basket, means defining an outlet from said collector ring adapted to discharge during the operation of said centrifuge into a receptacle positioned adjacent said centrifuge, means for forcibly cleaning the interior of said basket, a duct leading downwardly from adjacent the lower part of said coffee maker to and communicating with the exterior of said coffee maker, elapsed time apparatus adapted to terminate the operation of the means for rotating said basket at the expiration of a predetermined period and to set in operation the means for forcibly cleaning the interior of said basket.

18. A coffee maker according to claim 17, in which the means for forcibly cleaning the interior of said basket includes means for discharging jets of water against the interior of the same, and in which the interior of said basket carries obstructions adapted to arrest the rotational movement of liquid in said basket after the basket has stopped.

19. A coffee maker comprising a centrifuge, including a centrifuge basket of the imperforate overflow type, means for rotating said basket, a collector ring encircling one end of said basket, means defining an outlet from said collector ring adapted to discharge during the operation of said centrifuge into a receptacle positioned adjacent said coffee maker, a mixer adapted to mix hot water and ground roasted coffee, means defining